US012587996B2

(12) United States Patent
Yu et al.

(10) Patent No.: US 12,587,996 B2
(45) Date of Patent: Mar. 24, 2026

(54) LOCATION DETERMINATION METHOD AND APPARATUS, AND COMMUNICATION DEVICE

(71) Applicant: Beijing Xiaomi Mobile Software Co., Ltd., Beijing (CN)

(72) Inventors: Lei Yu, Beijing (CN); Wei Hong, Beijing (CN); Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 392 days.

(21) Appl. No.: 18/254,294

(22) PCT Filed: Nov. 30, 2020

(86) PCT No.: PCT/CN2020/132921
§ 371 (c)(1),
(2) Date: May 24, 2023

(87) PCT Pub. No.: WO2022/110206
PCT Pub. Date: Jun. 2, 2022

(65) Prior Publication Data
US 2024/0098686 A1     Mar. 21, 2024

(51) Int. Cl.
*H04W 64/00*       (2009.01)
*H04B 17/20*       (2015.01)
*H04W 84/06*       (2009.01)

(52) U.S. Cl.
CPC ........ *H04W 64/006* (2013.01); *H04B 17/254* (2023.05); *H04W 84/06* (2013.01)

(58) Field of Classification Search
CPC ....... H04W 64/00; H04W 4/029; H04W 4/02; H04W 64/006; H04W 4/023;
(Continued)

(56) References Cited

U.S. PATENT DOCUMENTS 6,246,361 B1* 6/2001 Weill .................... G01S 5/0268
                                                        342/357.57
2008/0153509 A1* 6/2008 Piekarski .............. H04W 64/00
                                                        455/456.2
(Continued)

FOREIGN PATENT DOCUMENTS

CN          1212375 A     3/1999
CN        102460201 A     5/2012
(Continued)

OTHER PUBLICATIONS

International Search Report and Written Opinion of International Application No. PCT/CN2020/132921, dated Jul. 26, 2021, 13 pages.
(Continued)

*Primary Examiner* — Kwasi Karikari
(74) *Attorney, Agent, or Firm* — Finnegan, Henderson, Farabow, Garrett & Dunner, L.L.P.

(57)          ABSTRACT

A method for determining a location, includes: determining location information of a User Equipment (UE) based on distances between the UE and one or more Non-Terrestrial Networks (NTN) service satellites of the UE at at least three different moments and location information of the one or more NTN service satellites of the UE at the at least three different moments, wherein orbital locations of the one or more NTN service satellites of the UE are different at the at least three different moments, and the orbital locations of the one or more NTN service satellites of the UE belong to at least two different satellite orbits.

15 Claims, 5 Drawing Sheets

(58) Field of Classification Search

CPC . H04W 92/18; H04W 64/003; H04W 36/322; H04W 88/02; H04W 4/025

See application file for complete search history.

(56) References Cited

U.S. PATENT DOCUMENTS

| | | | | |
|---|---|---|---|---|
| 2010/0194633 A1* | 8/2010 | Yamagata | ............... | G01S 19/42 342/357.33 |
| 2012/0026033 A1* | 2/2012 | Shiomi | ................... | G01S 19/42 342/357.25 |
| 2016/0109581 A1* | 4/2016 | Harvey | ................... | G01S 19/25 342/357.46 |

FOREIGN PATENT DOCUMENTS

| | | | |
|---|---|---|---|
| CN | 108226863 A | 6/2018 |
| JP | 2010-50964 A | 3/2010 |
| JP | 2015-503092 A | 1/2015 |
| JP | 2016-28506 A | 2/2016 |
| JP | 2019-537716 A | 12/2019 |

OTHER PUBLICATIONS

Notice of Reasons for Refusal issued by the Japanese Patent Office on Apr. 16, 2024, in corresponding Application No. JP 2023-532427 4 pages.

Nokia, Nokia Shanghai Bell, "NTN Requirements for UE Location", 3GPP TSG RAN WG1 Meeting #97, R1-1906089, Reno, USA, May 13-17, 2019 (6 pages).

Office Action for Chinese Patent Application No. 202080003798.9, dated Sep. 26, 2024, 10 pages.

\* cited by examiner

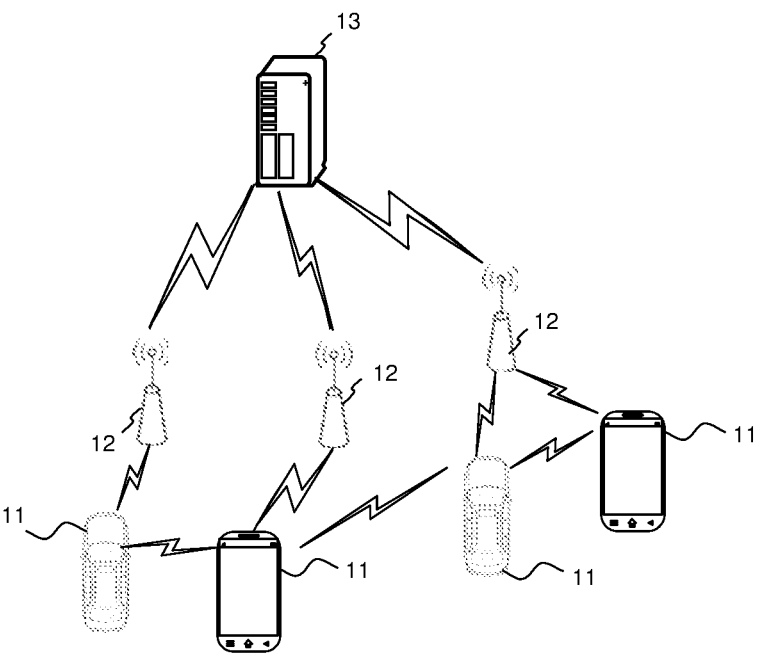

FIG. 1

| NTN communication device | | communication device on the other party |
|---|---|---| wireless communication

201: determine location information of a UE based on distances between the UE and NTN service satellite(s) of the UE at at least three different moments and location information of the NTN service satellite(s) of the UE at the at least three different moments, wherein orbital locations of the NTN service satellite(s) of the UE are different at the at least three different moments, and the orbital locations of the NTN service satellite(s) of the UE belong to at least two different satellite orbits

FIG. 2

LOCATION DETERMINATION METHOD AND APPARATUS, AND COMMUNICATION DEVICE

CROSS-REFERENCE TO RELATED APPLICATION

This application is a national phase of International Application No. PCT/CN2020/132921, filed on Nov. 30, 2020, the content of which is hereby incorporated by reference in its entirety.

TECHNICAL FIELD

The disclosure relates to, but is not limited to, a field of wireless communication technologies, and in particular to a method for determining a location, an apparatus for determining a location and a communication device.

BACKGROUND

Satellite communication has a wide range of application scenarios due to the characteristics of wide coverage range and high reliability. For example, the satellite communication can be applied in remote areas, disaster relief and rescue, and other situations. The satellite communication technology is considered to be an important part of future cellular mobile communication. In using a satellite for cellular mobile communication, the network needs to know the actual trusted location of User Equipment (UE), such as the location of the UE in the process of disaster relief and rescue for rescuing or the network can obtain the location of the UE to determine whether the UE is within the national boundary for authorization.

SUMMARY

According to a first aspect of the disclosure, a method for determining a location is provided. The method includes:

determining location information of a UE based on distances between the UE and Non-Terrestrial Networks (NTN) service satellite(s) of the UE at at least three different moments and location information of the NTN service satellite(s) of the UE at the at least three different moments, in which orbital locations of the NTN service satellite(s) of the UE are different at the at least three different moments, and the orbital locations of the NTN service satellite(s) of the UE belong to at least two different satellite orbits.

According to a second aspect of the disclosure, a communication device is provided. The communication device includes: a processor, and a memory storing a program executable by the processor. When the executable program is executed by the processor, the method for determining a location according to the first aspect is performed.

According to a second aspect of the disclosure, a non-transitory computer-readable storage medium is provided. The storage medium has stored thereon instructions that, when executed by a processor of a communication device, cause the communication device to perform the method for determining a location according to the first aspect.

It is understandable that both the foregoing general description and the following detailed description are illustrative and explanatory only and are not constructed to limit the embodiments of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

FIG. 1 is a schematic diagram illustrating a wireless communication system according to an embodiment.

FIG. 2 is a flowchart illustrating a method for determining a location according to an embodiment.

DETAILED DESCRIPTION

Figure 3:
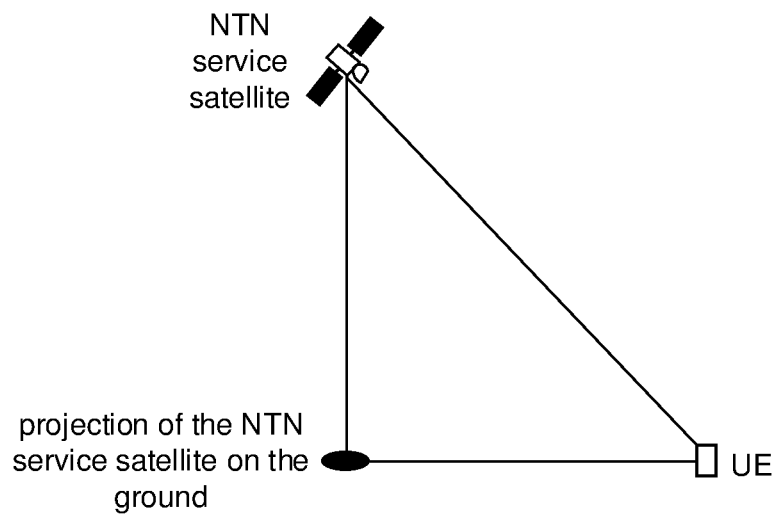
FIG. 3 is a schematic diagram illustrating locations of an NTN service satellite and the UE according to an embodiment.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

The terms used in the embodiments of the disclosure are intended solely for the purpose of describing particular embodiments and are not intended to limit the embodiments of the disclosure. The singular forms of "a", "said" and "the" as used in the embodiments of the disclosure and the appended claims are also intended to include plural forms, unless the context clearly indicates other meanings. It is understandable that the term "and/or" as used herein refers to and includes any or all possible combinations of one or more of the associated listed items.

It is understandable that although the terms "first," "second," "third," etc. may be employed in the embodiments of the disclosure to describe various kinds of information, such information should not be limited to these terms. These terms are used only to distinguish the same type of information from each other. For example, without departing from the scope of the embodiments of the disclosure, first information may also be referred to as second information, and similarly, second information may also be referred to as first information. Depending on the context, for example, the term "if" as used herein may be interpreted as "while . . . ", "when . . . " or "in response to determining".

FIG. 1 is a schematic diagram illustrating a wireless communication system according to an embodiment. As illustrated in FIG. 1, the wireless communication system is a communication system based on cellular mobile communication technology. The wireless communication system may include: a plurality of terminals 11 and a plurality of base stations 12.

The terminal 11 may be a device that provides voice and/or data connectivity to a user. The terminal 11 may communicate with one or more core networks via a Radio Access Network (RAN). The terminal 11 may be an Internet of Things (IoT) terminal, such as a sensor device, a cell phone (or "cellular" phone), and a computer with an IoT terminal. The terminal 11 may also be a stationary, portable, pocket-sized, handheld, computer-built, or vehicle-mounted device, such as, a Station (STA), a subscriber unit, a subscriber station, a mobile station, a mobile, a remote station, an access point, a remote terminal, an access terminal, a user terminal, a user agent, a user device, or a UE. Or, the terminal 11 may be an unmanned aerial vehicle device. Or, the terminal 11 may be an in-vehicle device, for example, an Electronic Control Unit (ECU) having wireless communication function, or a wireless communication device external to the ECU. Or, the terminal 11 can also be a roadside device, for example, a street light, a signal light, or other roadside devices having wireless communication function.

The base station 12 may be a network side device in a wireless communication system. The wireless communication system may be the 4th generation mobile communication (4G) system, also known as Long Term Evolution (LTE) system. Or, the wireless communication system may also be a 5G system, also known as New Radio (NR) system or 5G NR system. Or, the wireless communication system may be a next-generation system of the 5G system. The access network in the 5G system may be called New Generation-Radio Access Network (NG-RAN), or Mixed Traffic Control (MTC) system.

The base station 12 can be an evolved base station (eNB) employed in the 4G system. Or, the base station 12 may be a base station (gNB) with a centralized-distributed architecture employed in the 5G system. When the base station 12 adopts a centralized-distributed architecture, it usually includes a Central Unit (CU) and at least two Distributed Units (DUs). The centralized unit is equipped with the protocol stack of Packet Data Convergence Protocol (PDCP) layer, Radio Link Control (RLC) layer, and Media Access Control (MAC) layer. The DU is equipped with the protocol stack of the physical (PHY) layer, and the specific implementation of the base station 12 is not limited in this disclosure.

A wireless connection can be established between the base station 12 and the terminal 11 via a wireless NR. In different implementations, the wireless NR is a wireless NR based on the 4G standard. Or, the wireless NR is a wireless NR based on the 5G standard, such as a new NR. Or, the wireless NR may also be a wireless NR based on the standard of the next generation of 5G.

In some embodiments, E2E (End to End) connections can also be established between the terminals 11 in scenarios, such as, Vehicle to Vehicle (V2V) communication, Vehicle to Infrastructure (V2I) communication, and Vehicle to Pedestrian (V2P) communication in Vehicle to Everything (V2X) communication.

In some embodiments, the above wireless communication system may also include a network management device 13.

The plurality of base stations 12 are connected to the network management device 13 respectively. The network management device 13 may be a core network device in a wireless communication system, for example, a Mobility Management Entity (MME) in an Evolved Packet Core (EPC) network. Or, the network management device may be another core network device, such as a Serving GateWay (SGW), Public Data Network GateWay (PGW), Policy and Charging Rules Function (PCRF), or Home Subscriber Server (HSS), etc. The implementation form of the network management device 13 is not limited in the embodiments of the disclosure.

The execution subject involved in this embodiment includes, but is not limited to, a satellite and UE, such as a cell phone terminal supporting NTN cellular mobile communication.

One application scenario of the embodiments of the disclosure is that, generally, the NTN can obtain the location information of the UE in the following 2 ways.

In the first way, the UE informs the network of its own location of the UE, which will have the following defects.

The UE do not have the capability of obtaining its own location.

The location of the UE may be not true. The UE may report the incorrect location while determining whether the UE is within an authorized area.

The location information of the UE may be intercepted and tampered with.

In the second way, the UE is positioned via a base station, which will have the following defects.

For the UE adopting a Non-Terrestrial Networks (NTN) satellite for communication, the UE generally can connect to only one satellite at a time and cannot use the multi-base station positioning technology of terrestrial mobile communication.

One NTN satellite has a wide coverage area and it is difficult to confirm the exact location of the UE based on the satellite used.

As illustrated in FIG. 2, embodiments of the disclosure provide a method for determining a location and the method includes the following.

At block 201, location information of a UE is determined based on distances between the UE and NTN service satellite(s) of the UE at at least three different moments and location information of the NTN service satellite(s) of the UE at the at least three different moments. Orbital locations of the NTN service satellite(s) of the UE are different at the at least three different moments, and the orbital locations of the NTN service satellite(s) of the UE belong to at least two different satellite orbits.

The method for determining a location according to embodiments can be performed by a UE for NTN cellular mobile communication or a satellite in an NTN cellular mobile communication system.

The UE can establish a communication connection with a serving base station via a feeder line connection between an aerial platform, such as a satellite, and a ground station of the satellite, such as a GW. The NTN service satellite can be a satellite in the feeder line connection between the UE and the serving base station. The UE can establish a connection to the serving base station through one NTN service satellite at a time. The NTN service satellite(s) of the UE at different moments can be the same NTN service satellite or different NTN service satellites.

The UE or the NTN service satellite may measure the distances between the UE and the NTN service satellite(s) at the at least three different moments. The UE or the NTN service satellite may determine the distance between the UE and the NTN service satellite based on, for example, a time of flight of the signal between the UE and the NTN service satellite.

The orbital locations of the NTN service satellite(s) at three different moments can be determined based on the ephemeris. The location information of the NTN service satellite, such as the projection location of the orbital position of the NTN service satellite on the ground and the height of the NTN service satellite, can be determined based on the orbital location of the NTN service satellite. The distance between the UE and the projection location of the NTN service satellite on the ground can be determined based on the distance between the UE and the NTN service satellite and the height of the NTN service satellite. The location of the UE can be determined through a triangulation positioning method based on the projection location of the NTN service satellite at each of the at least three different moments on the ground and the distance between the UE and the projection location of the NTN service satellite at each of the above at least three different moments on the ground. The NTN service satellite(s) at the three different moments can be the same satellite or different satellites. The projection locations of the NTN service satellite(s) at the three different moments on the ground form a triangle.

In an embodiment, the above-mentioned "NTN service satellite(s) of the UE at the at least three different moments" at least include two satellites with different satellite orbits.

For example, the UE positioning is performed using one NTN service satellite at two different orbital locations of the same orbit and another NTN service satellite on another orbit.

The UE positioning can also be performed using at least three NTN service satellites on at least three orbits, and when measuring the distances, the at least three NTN service satellites are not on the same line.

For example, the satellite for mobile communication is generally on an orbit that is more than 600 kilometers (km) above the ground, and the height distance between the NTN service satellite and the ground can be determined based on the ephemeris. As illustrated in FIG. 3, if the distance between the NTN service satellite and the UE is known and the height distance between the NTN service satellite and the ground is known, the ground distance between the projection location of the NTN service satellite and the UE can be obtained according to the Pythagorean Theorem.

Figure 4:
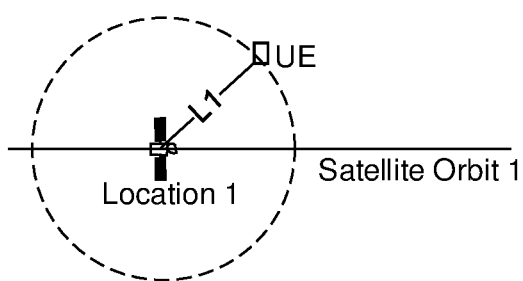
FIG. 4 is a schematic diagram illustrating locations of an NTN service satellite and the UE according to an embodiment.
Figure 5:
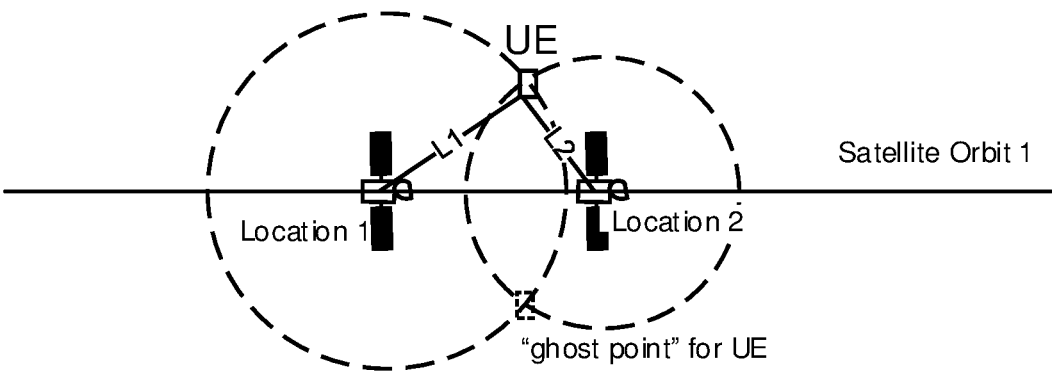
FIG. 5 is a schematic diagram illustrating locations of an NTN service satellite and the UE according to an embodiment.
Figure 6:
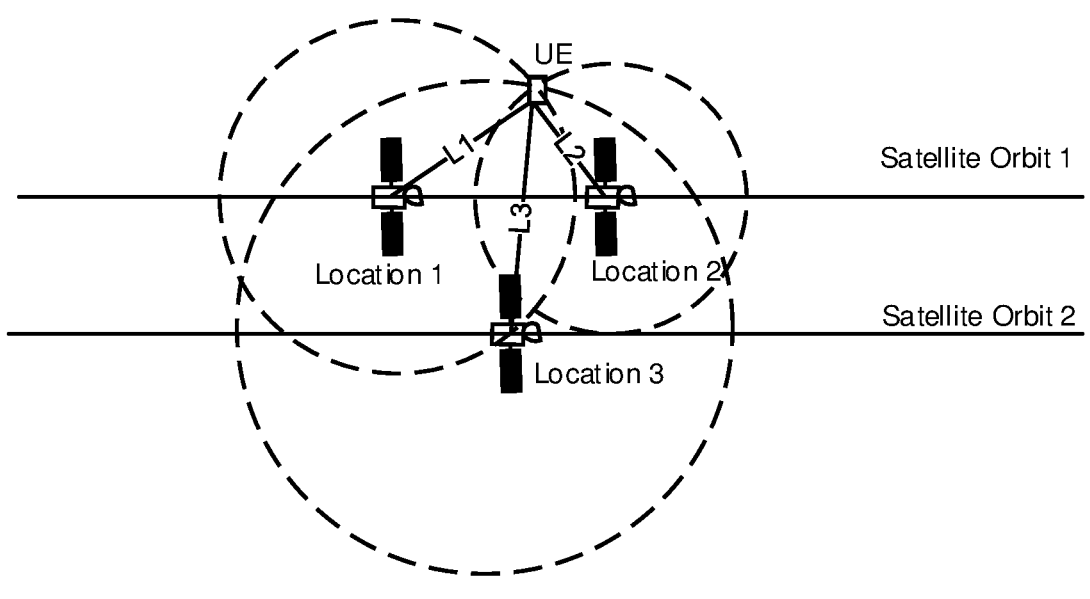
FIG. 6 is a schematic diagram illustrating locations of an NTN service satellite and the UE according to an embodiment.

FIGS. 4 to 6 are top views illustrating relative positions between the NTN service satellite(s) and the UE. As illustrated in FIG. 4, a distance between the projection location of the NTN service satellite on the ground and the UE can be determined as L1 when the NTN service satellite is at Location 1. It can be further known that the UE can be located at any point of a Circle A whose center is the projection location of the NTN service satellite on the ground, i.e., the Location 1, and the radius is the distance L1.

As illustrated in FIG. 5, when the NTN service satellite is at Location 2, a distance between the projection location of the NTN service satellite on the ground and the UE can be determined as L2. It can be further known that the UE is located at any point of a Circle B whose center is the projection location of the NTN service satellite on the ground, i.e., the Location 2, and the radius is the distance L2. The Circle A and the Circle B intersect at 2 points, one point is the true location of the UE and one point is the "ghost point".

As illustrated in FIG. 6, when the NTN service satellite is at Location 3, a distance between the projection location of the NTN service satellite on the ground and the UE can be determined as L3. It can be further known that the UE is located at any point of a Circle C whose center is the projection location of the NTN service satellite on the ground, i.e., the Location 3, and the radius is the distance L3. The Circle A, the Circle B and the Circle C intersect at one point, i.e., the true location of the UE.

Here, Location 1, Location 2 and Location 3 may not all belong to a same satellite orbit. The above-mentioned "NTN service satellite(s) at the three locations" can all be a same satellite or not all a same satellite.

In this way, the location of the UE is determined by the NTN service satellite(s) at the three moments. The problem that the UE cannot be located if the UE does not have the positioning capability such as GPS is solved, and the positioning of the UE is realized. In addition, by positioning the UE through the NTN service satellite, the intermediate steps of transmitting the UE location information can be omitted, which improves the reliability of the UE location information obtained by the NTN service satellite.

Figure 7:
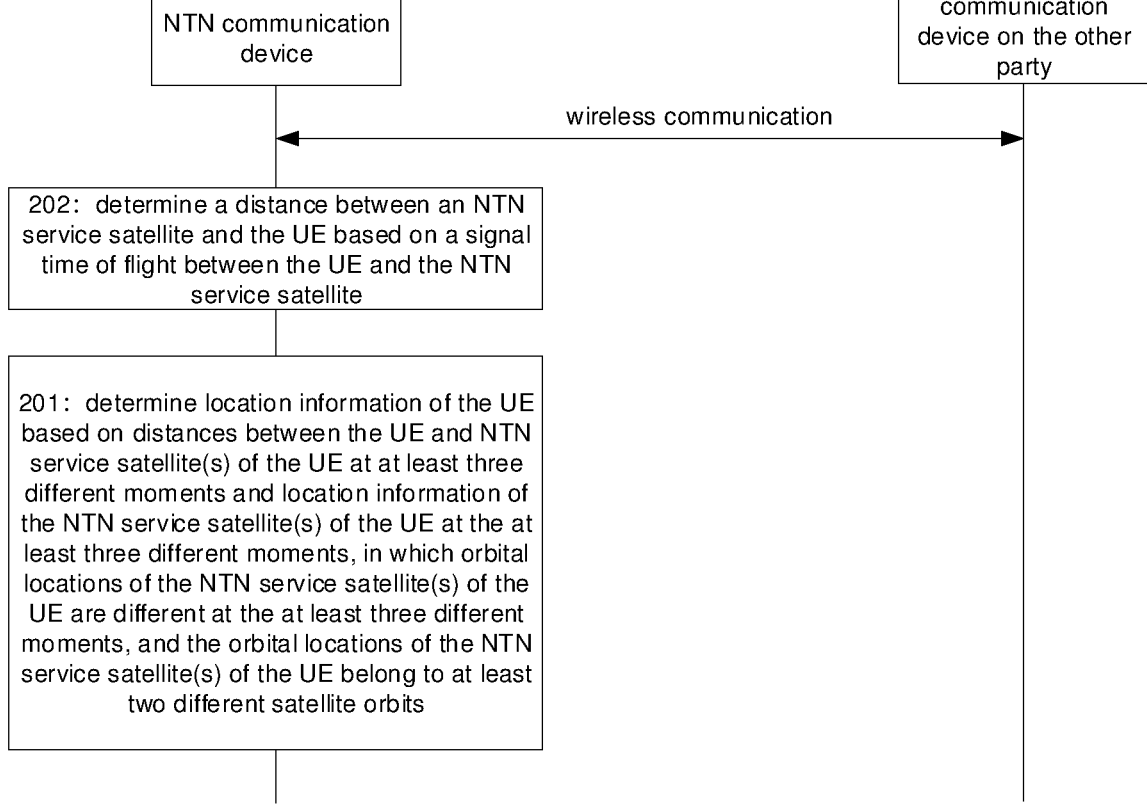
FIG. 7 is a flowchart illustrating another method for determining a location according to an embodiment.

In an embodiment, as illustrated in FIG. 7, the method further includes the following.

At block 202, a distance between an NTN service satellite and the UE is determined based on a signal time of flight between the UE and the NTN service satellite.

The distance between the UE and the NTN service satellite can be determined based on the transmission time of the signal between the UE and the NTN service satellite.

The propagation speed of the signal between the UE and the NTN service satellite is close to the speed of light, and the product of the speed of light and the transmission time of the signal between the UE and the NTN service satellite can be determined as the distance between the service satellite and the UE.

In an embodiment, determining the distance between the NTN service satellite and the UE based on the signal time of flight between the UE and the NTN service satellite includes: determining a signal time of flight for a first round trip signal between the NTN service satellite and the UE by subtracting a first launch response duration of the UE from a first interval duration between a first moment when the NTN service satellite sends a first positioning signal to the UE and a second moment when the NTN service satellite receives a second positioning signal sent by the UE, in which the second positioning signal is sent by the UE in response to receiving the first positioning signal and the first launch response duration includes: a time interval between a time when the first positioning signal is received by the UE and a time when the second positioning signal is sent; and determining the distance between the NTN service satellite and the UE based on the signal time of flight for the first round trip signal.

The first positioning signal and the second positioning signal may be signals specifically defined for performing distance measurements or existing signals transmitted between the UE and the NTN service satellite.

The distance measurement may be initiated by the NTN service satellite. For example, the NTN service satellite may send the first positioning signal to the UE and record the time when the first positioning signal is sent.

After receiving the first positioning signal, the UE can return the second positioning signal to the NTN service satellite. Since the UE needs to parse and decode the first positioning signal, there is a first launch response duration between the time when the first positioning signal is received by the UE and the time when the second positioning signal is sent.

After receiving the second positioning signal, the NTN service satellite may record the time when the second positioning signal is received. The NTN service satellite may determine a round trip duration of the signal between the NTN service satellite and the UE based on the time when the first positioning signal is sent, the time when the second positioning signal is received, and the first launch response duration, and then determine the distance between the NTN service satellite and the UE.

In an embodiment, in response to determining, by the NTN service satellite, the distance between the NTN service satellite and the UE based on the signal time of flight for the first round trip signal, the method further includes: receiving, by the NTN service satellite, indication information, sent by the UE, for indicating the first launch response duration.

The UE may record the time when the first positioning signal is received and the time when the second positioning signal is sent, and then determine the first launch response duration. The UE sends the indication information for indicating the first launch response duration to the NTN service satellite, and the NTN service satellite may determine the signal time of flight for the first round trip signal based on the first launch response duration indicated by the received indication information.

In an embodiment, determining the distance between the NTN service satellite and the UE based on the signal time of flight between the NTN service satellite and the UE includes: determining a signal time of flight for a second round trip signal between the NTN service satellite and the UE by subtracting a second launch response duration of the NTN service satellite from a second interval duration between a third moment when the UE sends a third positioning signal to the NTN service satellite and a fourth moment when the UE receives a fourth positioning signal sent by the NTN service satellite; in which the fourth positioning signal is sent by the NTN service satellite in response to receiving the third positioning signal and the second launch response duration includes: a time interval between a time when the third positioning signal is received by the NTN service satellite and a time when the fourth positioning signal is sent; and determining the distance between the NTN service satellite and the UE based on the signal time of flight for the second round trip signal.

The third positioning signal and the fourth positioning signal may be signals specifically defined for performing distance measurements or existing signals transmitted between the UE and the NTN service satellite.

The distance measurement may be initiated by the UE. For example the UE may send the third positioning signal to the NTN service satellite and record the time when the third positioning signal is sent.

After receiving the third positioning signal, the NTN service satellite can return the fourth positioning signal to the UE. Since the NTN service satellite needs to parse and decode the third positioning signal, there is a second launch response duration between the time when the third positioning signal is received by the NTN service satellite and the time when the fourth positioning signal is sent.

After receiving the fourth positioning signal, the UE may record the time when the fourth positioning signal is received. The UE may determine a round trip duration of the signal between the NTN service satellite and the UE based on the time when the third positioning signal is sent, the time when the fourth positioning signal is received, and the second launch response duration, and then further determine the distance between the NTN service satellite and the UE.

In an embodiment, in response to determining, by the UE, the distance between the NTN service satellite and the UE based on the signal time of time for the second round trip signal, the method further includes: receiving indication information, sent by the NTN service satellite, for indicating the third moment and the fourth moment.

The NTN service satellite may record the time at which the third positioning signal is received and the time at which the fourth positioning signal is sent, and determine the second launch response duration. The NTN service satellite sends the indication information for indicating the second launch response duration to the UE, and the UE may determine the signal time of flight for the second round trip signal based on the second launch response duration indicated by the received indication information.

A specific example is provided below in combination with any one of the above embodiments.

The satellite for mobile communication is generally a low orbiting satellite, which travels very fast relative to the ground. The speed of the UE relative to the ground may be considered relatively stationary compared to the speed of the satellite.

The satellite used for mobile communication is generally on an orbit that is more than 600 km above the ground, and the ground undulation within the satellite communication coverage area will exceed 1 km only under extreme conditions, so the ground can be regarded as flat and the distance between the satellite and the ground is known. Therefore, as illustrated in FIG. 3, if the satellite can measure the distance between it and the UE, the distance between the projection of the satellite and the UE can be obtained according to the Pythagorean theorem.

In embodiments of the disclosure, the satellite measures the distances to the UE at different moments, which is equivalent to measuring the distances between the satellite and the UE at different locations and the true location of the UE can be finally obtained.

The specific scheme is as follows.

1. The communication satellite or the UE sends a positioning signal to the other party and records the time when the signal is sent. For example, the time when the signal is sent is represented by t1.

2. After receiving the positioning signal, the UE or the satellite immediately sends the positioning signal to the other party, and records a time difference between a time when the positioning signal is received and the time when the positioning signal is sent. For example, the time difference is represented by Δt.

3. After receiving the signal sent by the other party, the satellite or the UE records the time when the signal is received. For example, the time when the signal is received is represented by t2.

4. The signal flight of time of the signal can be obtained, and the distance between the communication satellite and the UE can be calculated.

5. As illustrated in FIG. 4, the satellite 1 at location 1 can detect the distance between the satellite 1 and the UE and obtains a direct distance L1 between the projection of the satellite 1 on the ground and the UE, and then knows that the UE can be located on the circle whose center is the projection of the satellite on the ground sand the radius is the distance of L1

6. Similarly, as illustrated in FIG. 5, the satellite 1 at location 2 can determine a distance L2 between the projection of the satellite on the ground and the UE, and then knows that the UE can be located on the circle whose center is the projection of the satellite on the ground and the radius is the distance of L2. The possible locations of the UE can be determined based on the measurements made by the satellite at these two locations, one possible location is the true location of the UE and the other possible location is a location where the UE is possible at, i.e. the "ghost point".

7. As illustrated in FIG. 6, the satellite 2 at location 3 can determine a distance L3 between the projection of the satellite on the ground and the UE, and then knows that the UE is located on the circle whose center is the projection of the satellite on the ground and the radius is the distance of L3. An intersection point of these three circles obtained from the three measurements is the true location of the UE.

Figure 8:
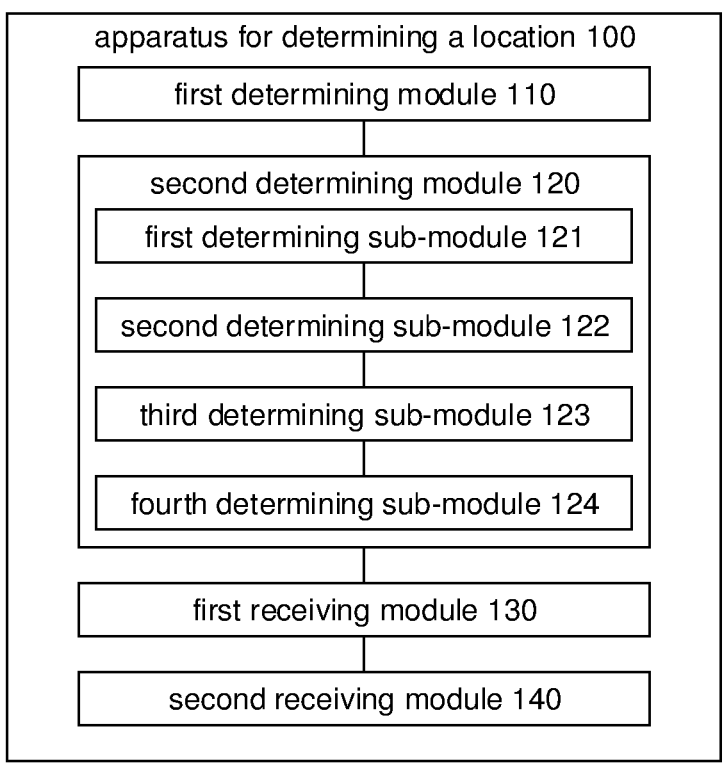
FIG. 8 is a schematic diagram illustrating an apparatus for determining a location according to an embodiment.

Embodiments of the disclosure also provide an apparatus for determining a location, applied to an NTN communication device for wireless communication. As illustrated in FIG. 8, the apparatus 100 includes: a first determining module 110.

The first determining module 110 is configured to determine location information of a UE based on distances between the UE and NTN service satellite(s) of the UE at at least three different moments and location information of the NTN service satellite(s) of the UE at the at least three different moments, in which orbital locations of the NTN service satellite(s) of the UE are different at the at least three different moments, and the orbital locations of the NTN service satellite(s) of the UE belong to at least two different satellite orbits.

In an embodiment, the apparatus 100 further includes: a second determining module 120.

The second determining module 120 is configured to determine a distance between the NTN service satellite and the UE based on a signal time of flight between the UE and the NTN service satellite.

In an embodiment, the second determining module 120 includes: a first determining sub-module 121 and a second determining sub-module 122.

The first determining sub-module 121 is configured to determine a signal time of flight for a first round trip signal between the NTN service satellite and the UE by subtracting a first launch response duration of the UE from a first interval duration between a first moment when the NTN service satellite sends a first positioning signal to the UE and a second moment when the NTN service satellite receives a second positioning signal sent by the UE, in which the second positioning signal is sent by the UE in response to receiving the first positioning signal, the first launch response duration includes: a time interval between a time when the first positioning signal is received by the UE and a time when the second positioning signal is sent.

The second determining sub-module 122 is configured to determine the distance between the NTN service satellite and the UE based on the signal time of flight for the first round trip signal.

In an embodiment, the apparatus 100 further includes: a first receiving module 130, configured to, in response to determining, by the NTN service satellite, the distance between the NTN service satellite and the UE based on the signal time of flight for the first round trip signal, receive indication information, sent by the UE, for indicating the first launch response duration.

In an embodiment, the second determining module 120 includes: a third determining sub-module 123 and a fourth determining sub-module 124.

The third determining sub-module 123 is configured to determine a signal time of flight for a second round trip signal between the NTN service satellite and the UE by subtracting a second launch response duration of the NTN service satellite from a second interval duration between a third moment when the UE sends a third positioning signal to the NTN service satellite and a fourth moment when the UE receives a fourth positioning signal sent by the NTN service satellite, in which the fourth positioning signal is sent by the NTN service satellite in response to receiving the third positioning signal, the second launch response duration includes: a time interval between a time when the third positioning signal is received by the NTN service satellite and a time when the fourth positioning signal is sent.

The fourth determining sub-module 124 is configured to determine the distance between the NTN service satellite and the UE based on the signal time of flight for the second round trip signal.

In an embodiment, the apparatus 100 further includes: a second receiving module 140, configured to, in response to determining, by the UE, the distance between the NTN service satellite and the UE based on the signal time of flight for the second round trip signal, receive indication information, sent by the NTN service satellite, for indicating the third moment and the fourth moment.

In an embodiment, the NTN service satellite of the UE at the at least three different moments at least includes two satellites with different satellite orbits.

In the embodiments, the first determining module 110, the second determining module 120, the first receiving module 130, and the second receiving module 140, can be implemented by one or more Central Processing units (CPUs), Graphics Processing Units (GPUs), Baseband Processors (BPs), Application Specific Integrated Circuits (ASICs), DSPs, Programmable Logic Devices (PLDs), Complex Programmable Logic Devices (CPLDs), Field-Programmable Gate Array (FPGAs), general processors, controllers, Micro Controller Units (MCUs), microprocessors or other electronic components, and can be used to implement the above method.

Figure 9:
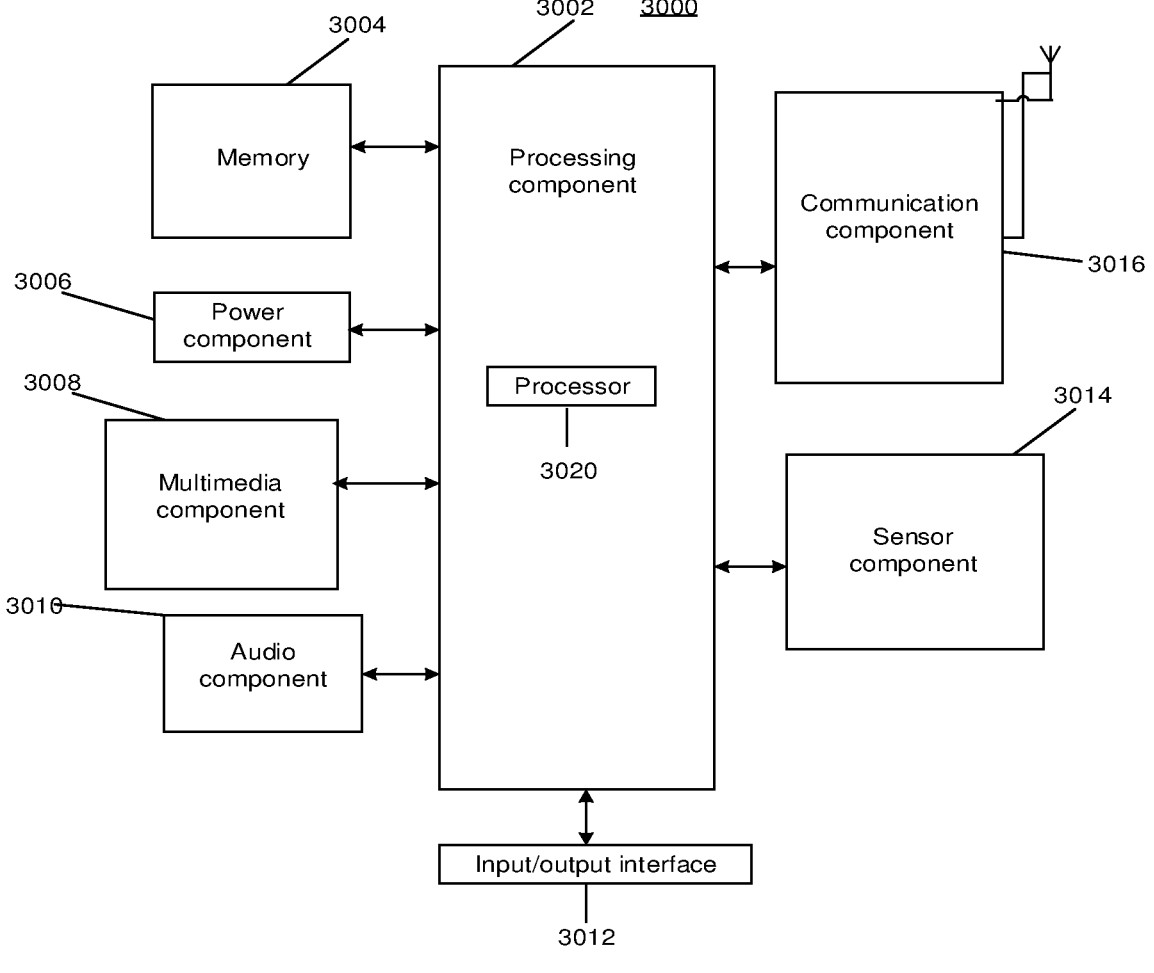
FIG. 9 is a block diagram illustrating a communication device according to an embodiment.

FIG. 9 is a block diagram illustrating a communication device 3000 according to an embodiment. For example, the device 3000 may be a mobile phone, a computer, a digital broadcasting terminal, a message transceiver device, a game console, a tablet device, a medical device, a fitness device and a personal digital assistant.

As illustrated in FIG. 9, the device 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls overall operations of the device 3000, such as the operations associated with display, telephone calls, data communications, camera operations, and recording operations. The processing component 3002 may include one or more processors 3020 to perform all or part of the steps in the above described method. Moreover, the processing component 3002 may include one or more modules which facilitate the interaction between the processing component 3002 and other components. For example, the processing component 3002 may include a multimedia module to facilitate the interaction between the multimedia component 3008 and the processing component 3002.

The memory 3004 is configured to store various types of data to support the operation of the device 3000. Examples of such data include instructions for any applications or methods operated on the device 3000, contact data, phonebook data, messages, pictures, video, etc. The memory 3004 may be implemented using any type of volatile or nonvolatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read-Only Memory (PROM), a Read Only Memory (ROM), a magnetic memory, a flash memory, a magnetic or optical disk.

The power component 3006 provides power to various components of the device 3000. The power component 3006 may include a power management system, one or more power sources, and any other components associated with the generation, management, and distribution of power in the device 3000.

The multimedia component 3008 includes a screen providing an output interface between the device 3000 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 3008 includes a front-facing camera and/or a rear-facing camera. When the device 3000 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 3010 is configured to output and/or input audio signals. For example, the audio component 3010 includes a microphone (MIC) configured to receive an external audio signal when the device 3000 is in an operation mode, such as a call mode, a recording mode, and a voice recognition mode. The received audio signal may be further stored in the memory 3004 or transmitted via the communication component 3016. In some embodiments, the audio component 3010 further includes a speaker to output audio signals.

The I/O interface 3012 provides an interface between the processing component 3002 and peripheral interface modules, such as a keyboard, a click wheel, buttons, and other situations. The buttons may include, but are not limited to, a home button, a volume button, a starting button, and a locking button.

The sensor component 3014 includes one or more sensors to provide status assessments of various aspects of the device 3000. For instance, the sensor component 3014 may detect an open/closed status of the device 3000, relative positioning of components, e.g., the display and the keypad, of the device 3000, a change in position of the device 3000 or a component of the device 3000, a presence or absence of user contact with the device 3000, an orientation or an acceleration/deceleration of the device 3000, and a change in temperature of the device 3000. The sensor component 3014 may include a proximity sensor configured to detect the presence of nearby objects without any physical contact. The sensor component 3014 may also include a light sensor, such as a Complementary Metal Oxide Semiconductor (CMOS) or Charge-Coupled Device (CCD) image sensor, for use in imaging applications. In some embodiments, the sensor component 3014 may also include an accelerometer sensor, a gyroscope sensor, a magnetic sensor, a pressure sensor, or a temperature sensor.

The communication component 3016 is configured to facilitate communication, wired or wirelessly, between the device 3000 and other devices. The device 3000 can access a wireless network based on a communication standard, such as WiFi, 2G, or 3G, or a combination thereof. In an embodiment, the communication component 3016 receives a broadcast signal or broadcast associated information from an external broadcast management system via a broadcast channel. In an embodiment, the communication component 3016 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In embodiments, the device 3000 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described method.

In embodiments, there is also provided a non-transitory computer readable storage medium including executable instructions, such as the memory 3004, executable by the processor 3020 in the device 3000, for performing the above method. For example, the non-transitory computer-readable storage medium may be a ROM, a Random Access Memory (RAM), a CD-ROM, a magnetic tape, a floppy disc, and an optical data storage device.

With the method, the apparatus and the communication device according to the embodiments of the disclosure, the UE or the NTN service satellite(s) determine the location information of the UE based on the distances between the UE and the NTN service satellite(s) of the UE at the at least three different moments and the location information of the NTN service satellite(s) of the UE at the at least three different moments. The orbital locations of the NTN service satellite(s) of the UE at the at least three different moments are different, and the orbital locations of the NTN service satellite(s) of the UE belong to at least two different satellite orbits. In this way, the location of the UE is determined by the NTN service satellite(s) at three different moments. The problem that the UE cannot be located if the UE does not have a positioning capability, such as GPS, can be solved and the positioning of the UE can be achieved. In addition, by positioning the UE by the NTN service satellite(s), the intermediate steps of transmitting UE location information can be omitted, which improves the reliability of the UE location information obtained by the NTN service satellite.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as illustrative only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for determining a location, comprising:
determining distances between a user equipment (UE) and one or more Non-Terrestrial Network (NTN) service satellites of the UE at at least three different moments;
determining circles corresponding to the at least three different moments by taking projections, on a ground, of the one or more NTN service satellites at the at least three different moments as centers and by taking distances between the UE and the projections as radii, wherein the distance between the UE and the projection is determined based on a distance between the UE and the NTN service satellite and a height of the NTN service satellite;

determining location information of the UE based on intersections of the circles, wherein the NTN service satellites comprise at least two NTN service satellites of different locations at the at least three different moments, the at least two NTN service satellites are located on a plurality of satellite orbits, there is one or more NTN service satellites on each satellite orbit, orbital locations of the one or more NTN service satellites on one satellite orbit are different, and the NTN service satellite is a low orbiting satellite for mobile communication, wherein determining a distance between the UE and an NTN service satellite of the UE comprises:

determining a signal time of flight for a round trip signal between the UE and the NTN service satellite based on a combination of a first moment and a second moment or based on a combination of a third moment and a fourth moment; and determining the distance between the UE and the NTN service satellite based on the signal time of flight for the round trip signal, wherein the first moment is moment when the NTN service satellite sends a first positioning signal to the UE, the second moment is a moment when the NTN service satellite receives a second positioning signal sent by the UE, the third moment is a moment when the UE sends a third positioning signal to the NTN service satellite, and the fourth moment is a moment when the UE receives a fourth positioning signal sent by the NTN service satellite, and the first positioning signal, the second positioning signal, the third positioning signal and the fourth positioning signal are not signals dedicated to distance measurement.

2. The method of claim 1, wherein determining the signal time of flight for the round trip signal based on the combination of the first moment and the second moment comprises:

determining the signal time of flight for a first round trip signal between the NTN service satellite and the UE by subtracting a first launch response duration of the UE from a first interval duration between the first moment when the NTN service satellite sends the first positioning signal to the UE and the second moment when the NTN service satellite receives the second positioning signal sent by the UE; wherein the second positioning signal is sent by the UE in response to receiving the first positioning signal and the first launch response duration comprises: a time interval between a time when the first positioning signal is received by the UE and a time when the second positioning signal is sent; and wherein determining the distance between the UE and the NTN service satellite based on the signal time of flight for the round trip signal comprises: determining the distance between the NTN service satellite and the UE based on the signal time of flight for the first round trip signal.

3. The method of claim 2, wherein in response to determining, by the NTN service satellite, the distance between the NTN service satellite and the UE based on the signal time of flight for the first round trip signal, the method further comprises:

receiving, by the NTN service satellite, indication information, sent by the UE, for indicating the first launch response duration.

4. The method of claim 1, wherein determining the signal time of flight for the round trip signal based on the combination of the third moment and the fourth moment comprises:

determining the signal time of flight for a second round trip signal between the NTN service satellite and the UE by subtracting a second launch response duration of the NTN service satellite from a second interval duration between the third moment when the UE sends the third positioning signal to the NTN service satellite and the fourth moment when the UE receives the fourth positioning signal sent by the NTN service satellite; wherein the fourth positioning signal is sent by the NTN service satellite in response to receiving the third positioning signal and the second launch response duration comprises: a time interval between a time when the third positioning signal is received by the NTN service satellite and a time when the fourth positioning signal is sent; and wherein determining the distance between the UE and the NTN service satellite based on the signal time of flight for the round trip signal comprises: determining the distance between the NTN service satellite and the UE based on the signal time of flight for the second round trip signal.

5. The method of claim 4, wherein in response to determining, by the UE, the distance between the NTN service satellite and the UE based on the signal time of flight for the second round trip signal, the method further comprises:

receiving, by the UE, indication information, sent by the NTN service satellite, for indicating the second launch response duration.

6. A communication device, comprising:

a processor; and a memory storing a program executable by the processor, wherein the processor is configured to:

determine distances between a user equipment (UE) and one or more Non-Terrestrial Network (NTN) service satellites of the UE at least three different moments;

determine circles corresponding to the at least three different moments by taking projections, on a ground, of the one or more NTN service satellites at the at least three different moments as centers and by taking distances between the UE and the projections as radii, wherein the distance between the UE and the projection is determined based on a distance between the UE and the NTN service satellite and a height of the NTN service satellite;

determine location information of the UE based on intersections of the circles, wherein the NTN service satellites comprise at least two NTN service satellites of different locations at the at least three different moments, the at least two NTN service satellites are located on a plurality of satellite orbits, there is one or more NTN service satellites on each satellite orbit, orbital locations of the one or more NTN service satellites on one satellite orbit are different, and the NTN service satellite is a low orbiting satellite for mobile communication, wherein the processor is configured to:

determine a signal time of flight for a round trip signal between the UE and the NTN service satellite based on a combination of a first moment and a second moment or based on a combination of a third moment and a fourth moment; and determine the distance between the UE and the NTN service satellite based on the signal time of flight for the round trip signal, wherein the first moment is moment when the NTN service satellite sends a first positioning signal to the UE, the second moment is a moment when the NTN service satellite receives a second positioning signal sent by the UE, the third moment is a moment when the UE sends a third positioning signal to the NTN service satellite, and the fourth moment is a moment when the UE receives a fourth positioning signal sent by the NTN service satellite, and the first positioning signal, the second positioning signal, the third positioning signal and the fourth positioning signal are not signals dedicated to distance measurement.

7. The communication device of claim 6, wherein the processor is further configured to:

determine the signal time of flight for a first round trip signal between the NTN service satellite and the UE by subtracting a first launch response duration of the UE from a first interval duration between the first moment when the NTN service satellite sends the first positioning signal to the UE and the second moment when the NTN service satellite receives the second positioning signal sent by the UE; wherein the second positioning signal is sent by the UE in response to receiving the first positioning signal and the first launch response duration comprises: a time interval between a time when the first positioning signal is received by the UE and a time when the second positioning signal is sent; and determine the distance between the NTN service satellite and the UE based on the signal time of flight for the first round trip signal.

8. The communication device of claim 7, wherein the communication device is the NTN service satellite, and the processor is further configured to:

receive indication information, sent by the UE, for indicating the first launch response duration.

9. The communication device of claim 6, wherein the processor is further configured to:

determine the signal time of flight for a second round trip signal between the NTN service satellite and the UE by subtracting a second launch response duration of the NTN service satellite from a second interval duration between the third moment when the UE sends the third positioning signal to the NTN service satellite and the fourth moment when the UE receives the fourth positioning signal sent by the NTN service satellite; wherein the fourth positioning signal is sent by the NTN service satellite in response to receiving the third positioning signal and the second launch response duration comprises: a time interval between a time when the third positioning signal is received by the NTN service satellite and a time when the fourth positioning signal is sent; and determine the distance between the NTN service satellite and the UE based on the signal time of flight for the second round trip signal.

10. The communication device of claim 9, wherein the communication device is the UE, and the processor is further configured to:

receive indication information, sent by the NTN service satellite, for indicating the second launch response duration.

11. A non-transitory computer-readable storage medium having stored thereon instructions that, when executed by a processor of a communication device, cause the communication device to perform a method for determining a location, the method comprising:

determining distances between a user equipment (UE) and one or more Non-Terrestrial Network (NTN) service satellites of the UE at at least three different moments;

determining circles corresponding to the at least three different moments by taking projections, on a ground, of the one or more NTN service satellites at the at least three different moments as centers and by taking distances between the UE and the projections as radii, wherein the distance between the UE and the projection is determined based on a distance between the UE and the NTN service satellite and a height of the NTN service satellite;

determining location information of the UE based on intersections of the circles, wherein the NTN service satellites comprise at least two NTN service satellites of different locations at the at least three different moments, the at least two NTN service satellites are located on a plurality of satellite orbits, there is one or more NTN service satellites on each satellite orbit, orbital locations of the one or more NTN service satellites on one satellite orbit are different, and the NTN service satellite is a low orbiting satellite for mobile communication, wherein determining a distance between the UE and an NTN service satellite of the UE comprises:

determining a signal time of flight for a round trip signal between the UE and the NTN service satellite based on a combination of a first moment and a second moment or based on a combination of a third moment and a fourth moment; and determining the distance between the UE and the NTN service satellite based on the signal time of flight for the round trip signal, wherein the first moment is moment when the NTN service satellite sends a first positioning signal to the UE, the second moment is a moment when the NTN service satellite receives a second positioning signal sent by the UE, the third moment is a moment when the UE sends a third positioning signal to the NTN service satellite, and the fourth moment is a moment when the UE receives a fourth positioning signal sent by the NTN service satellite, and the first positioning signal, the second positioning signal, the third positioning signal and the fourth positioning signal are not signals dedicated to distance measurement.

12. The non-transitory computer-readable storage medium of claim 11, wherein determining the signal time of flight for the round trip signal based on the combination of the first moment and the second moment comprises:

determining the signal time of flight for a first round trip signal between the NTN service satellite and the UE by subtracting a first launch response duration of the UE from a first interval duration between the first moment when the NTN service satellite sends the first positioning signal to the UE and the second moment when the NTN service satellite receives the second positioning signal sent by the UE; wherein the second positioning signal is sent by the UE in response to receiving the first positioning signal and the first launch response duration comprises: a time interval between a time when the first positioning signal is received by the UE and a time when the second positioning signal is sent; and determining the distance between the NTN service satellite and the UE based on the signal time of flight for the first round trip signal.

13. The non-transitory computer-readable storage medium of claim 12, wherein in response to determining, by the NTN service satellite, the distance between the NTN service satellite and the UE based on the signal time of flight for the first round trip signal, the method further comprises:

receiving, by the NTN service satellite, indication information, sent by the UE, for indicating the first launch response duration.

14. The non-transitory computer-readable storage medium of claim 11, wherein determining the signal time of flight for the round trip signal based on the combination of the first moment and the second moment comprises:

determining the signal time of flight for a second round trip signal between the NTN service satellite and the UE by subtracting a second launch response duration of the NTN service satellite from a second interval duration between the third moment when the UE sends the third positioning signal to the NTN service satellite and the fourth moment when the UE receives the fourth positioning signal sent by the NTN service satellite; wherein the fourth positioning signal is sent by the NTN service satellite in response to receiving the third positioning signal and the second launch response duration comprises: a time interval between a time when the third positioning signal is received by the NTN service satellite and a time when the fourth positioning signal is sent; and determining the distance between the NTN service satellite and the UE based on the signal time of flight for the second round trip signal.

15. The non-transitory computer-readable storage medium of claim 14, wherein in response to determining, by the UE, the distance between the NTN service satellite and the UE based on the signal time of flight for the second round trip signal, the method further comprises:

receiving, by the UE, indication information, sent by the NTN service satellite, for indicating the second launch response duration.

* * * * *